US012693231B2

(12) United States Patent
Koyanagi

(10) Patent No.: US 12,693,231 B2
(45) Date of Patent: Jul. 28, 2026

(54) APPEARANCE INSPECTION METHOD FOR GOODS

(71) Applicant: Mitsubishi Electric Corporation, Tokyo (JP)

(72) Inventor: Motoyoshi Koyanagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 103 days.

(21) Appl. No.: 18/855,670

(22) PCT Filed: Jul. 25, 2022

(86) PCT No.: PCT/JP2022/028626
§ 371 (c)(1),
(2) Date: Oct. 10, 2024

(87) PCT Pub. No.: WO2024/023888
PCT Pub. Date: Feb. 1, 2024

(65) Prior Publication Data
US 2025/0321194 A1 Oct. 16, 2025

(51) Int. Cl.
*G01N 21/88* (2006.01)
*G01N 21/95* (2006.01)

(52) U.S. Cl.
CPC ..... *G01N 21/8806* (2013.01); *G01N 21/8851* (2013.01); *G01N 21/9501* (2013.01); *G01N 2021/8841* (2013.01)

(58) Field of Classification Search
CPC ........... G01N 21/8806; G01N 21/8851; G01N 21/9501; G01N 2021/8841
See application file for complete search history.

(56) References Cited

U.S. PATENT DOCUMENTS 5,452,080 A 9/1995 Tomiya
2004/0218040 A1* 11/2004 Akiyama ................. H04N 7/18
348/92

FOREIGN PATENT DOCUMENTS

JP H05-099635 A 4/1993
JP H07-098216 A 4/1995
(Continued)

OTHER PUBLICATIONS

International Search Report issued in PCT/JP2022/028626; mailed Sep. 6, 2022.

*Primary Examiner* — Georgia Y Epps
*Assistant Examiner* — Don J Williams
(74) *Attorney, Agent, or Firm* — Studebaker Brackett PLLC

(57) ABSTRACT

This appearance inspection method for goods is on a to-be-inspected object including: a planar tray having a front surface provided with colorless and transparent pockets each of which having a support that supports the to-be-inspected object through contact with the to-be-inspected object so as to extend along an outer periphery of the to-be-inspected object, the pocket having a space formed in an area in which no contact with the to-be-inspected object occurs; first cameras being capable of imaging the to-be-inspected objects from the front surface side and the back surface side of the tray; and a second camera capable of imaging the to-be-inspected objects from four side surfaces other than the front surface and the back surface. The to-be-inspected objects are imaged from the front surface and the back surface of the tray by the first cameras and imaged from the four side surfaces by the second camera.

10 Claims, 9 Drawing Sheets

(56) References Cited

FOREIGN PATENT DOCUMENTS

| | | | |
|---|---|---|---|
| JP | 2000-018927 | A | 1/2000 |
| JP | 2008-292359 | A | 12/2008 |
| JP | 2014-139525 | A | 7/2014 |

* cited by examiner

APPEARANCE INSPECTION METHOD FOR GOODS

TECHNICAL FIELD

The present disclosure relates to an appearance inspection method for goods.

As a conventional appearance inspection method for goods such as semiconductor packages, a method for a to-be-inspected object transported from a feeder unit has been employed (see, for example, Patent Document 1). In this method, two cameras are disposed on an upper side and a lower side such that a light-transmissive member provided on a transport path is interposed between the cameras, and two side surfaces of the light-transmissive member are subjected to mirror finishing, whereby the entire periphery of the to-be-inspected object excluding both end portions thereof in the direction of the transport is imaged and inspected by the two cameras disposed on the upper side and the lower side.

Another method has also been disclosed (see, for example, Patent Document 2). In this method, four mirrors are disposed so as to face obliquely upward and so as to enclose a to-be-inspected object, and images of an upper surface of the to-be-inspected object and side surfaces of the to-be-inspected object that are reflected by the four mirrors are taken in as inspection images by a camera, whereby the upper surface and the side surfaces in the appearance of the to-be-inspected object are simultaneously inspected.

CITATION LIST

Patent Document

Patent Document 1: Japanese Laid-Open Patent Publication No. 2014-139525

Patent Document 2: Japanese Laid-Open Patent Publication No. 2000-018927

SUMMARY OF THE INVENTION

Problem to be Solved by the Invention

Patent Document 1 has problems such as the following problem. That is, a configuration is employed in which a to-be-inspected object is transported from the feeder unit and is imaged while the to-be-inspected object is slipping down on the transport path. Thus, in a case where the to-be-inspected object has such a comparatively simple structure as to have front and back sides between which the shape and inspection item are the same and has an unlimited contact area, this configuration is effective. However, in a case where the to-be-inspected object has front and back sides between which the shape and inspection item differ and has a limited contact area (e.g., in the case of an infrared sensor module), this configuration requires fixation of an imaging/inspection direction or an inspection position and also requires that the position at which the to-be-inspected object is held is a position allowing contact.

Also, Patent Document 2 has problems such as the following problem. That is, since the four mirrors are provided so as to enclose a to-be-inspected object, the upper surface and the four side surfaces of the to-be-inspected object can be simultaneously inspected, but a to-be-inspected object needs to be mounted on an inspection stage dedicated to the to-be-inspected object. Thus, a plurality of identical environments need to be provided for simultaneously inspecting a plurality of to-be-inspected objects in order to more efficiently perform inspection. In this case, adaptation to a product having a different shape requires provision of a device dedicated to the product.

The present disclosure has been made to solve the above problems, and an object of the present disclosure is to provide an appearance inspection method for goods in which, even when a to-be-inspected object being subjected to this inspection method for goods has front and back sides between which the shape and inspection item differ and has a limited contact area, a plurality of the to-be-inspected objects can be collectively imaged and inspected in a state where: each of the to-be-inspected objects is held only at the limited area thereof; and an imaging/inspection direction or position is fixed.

Means to Solve the Problem

An appearance inspection method for goods according to the present disclosure is an appearance inspection method for performing appearance inspection on a to-be-inspected object by using an appearance inspection device including:

a planar tray having a plurality of transparent pockets in which a plurality of the respective to-be-inspected objects are placed away from each other, each of the pockets having a support which, when the corresponding to-be-inspected object is placed in the pocket, supports the to-be-inspected object through contact with the to-be-inspected object so as to extend along an outer periphery of the to-be-inspected object;

a plurality of first cameras disposed away from each other on a front surface side and a back surface side of the planar tray, the first cameras being capable of collectively and simultaneously imaging the plurality of to-be-inspected objects from the front surface side and the back surface side of the tray; and a second camera capable of imaging the plurality of to-be-inspected objects from side surfaces of the planar tray other than the front surface and the back surface, wherein the pockets of the tray are formed in a grid pattern as seen from the front surface side, and the to-be-inspected objects are arranged such that one of the to-be-inspected objects is placed per specific longitudinal direction or lateral direction of the pockets in the grid pattern and such that only one of the to-be-inspected objects is placed in a same direction as seen from any of the side surfaces, and the plurality of to-be-inspected objects are imaged from the front surface side and the back surface side of the tray by the first cameras and are imaged from the side surfaces by the second camera such that the to-be-inspected objects are simultaneously imaged and inspected from the front surface, the back surface, and the side surfaces of the tray.

Effect of the Invention

The appearance inspection method for goods according to the present disclosure makes it possible to provide an appearance inspection method for goods in which, even when a to-be-inspected object has front and back sides between which the shape and inspection item differ and has a limited contact area, a plurality of the to-be-inspected objects can be collectively imaged and inspected in a state where: each of the to-be-inspected objects is held only at the limited area thereof; and an imaging/inspection direction or position is fixed.

DESCRIPTION OF EMBODIMENTS

The present disclosure relates to, for example, an appearance inspection method for collectively imaging and inspecting the front surfaces and the back surfaces of a plurality of semiconductor packages mounted in a colorless and transparent tray.

Embodiment 1

An appearance inspection device used for an appearance inspection method for goods according to embodiment 1 will be described with reference to the following drawings.

Figure 1:
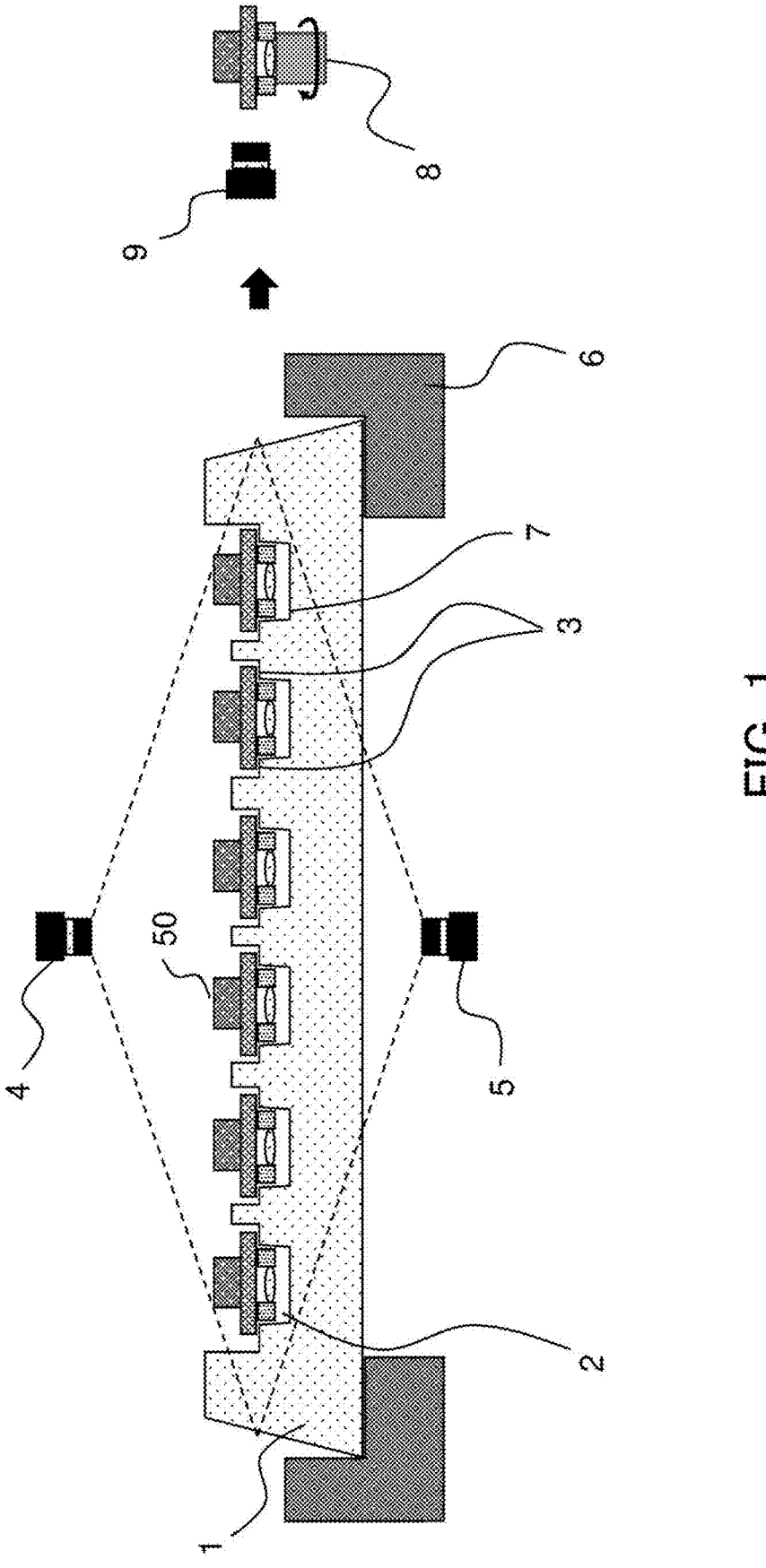
FIG. 1 is a diagram for explaining an example of an appearance inspection device used for an appearance inspection method for goods according to embodiment 1.

FIG. 1 is a side view showing an example of an appearance inspection device used for an appearance inspection method for semiconductor packages according to embodiment 1. A to-be-inspected product to be inspected by the present appearance inspection device is, for example, a semiconductor package represented by an infrared sensor module shown in each of FIG. 2A, FIG. 2B, and FIG. 2C. Here, FIG. 2A is a top view showing an example of the infrared sensor module, FIG. 2B is a front view showing the example of the infrared sensor module, and FIG. 2C is a bottom view showing the example of the infrared sensor module.

Figure 2A:
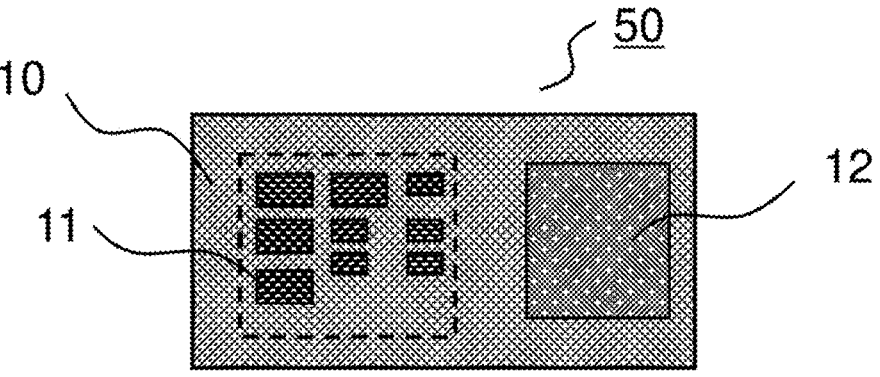
FIG. 2A is a top view for explaining an example of a to-be-inspected object used for the appearance inspection method for goods according to embodiment 1.
Figure 2B:
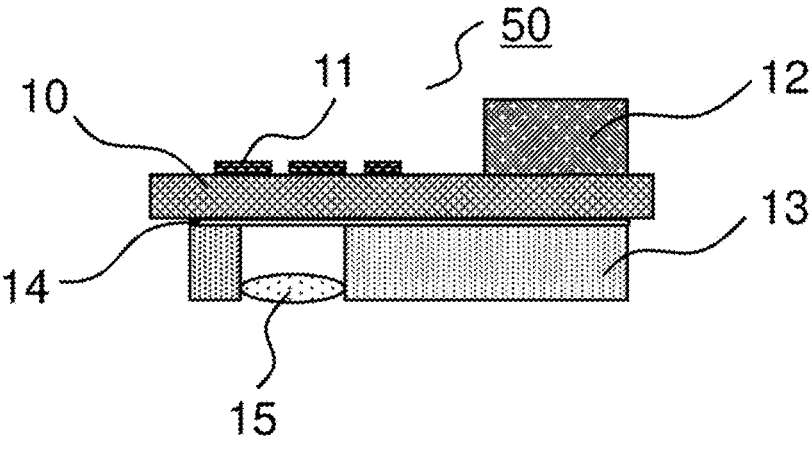
FIG. 2B is a front view for explaining the example of the to-be-inspected object used for the appearance inspection method for goods according to embodiment 1.
Figure 2C:
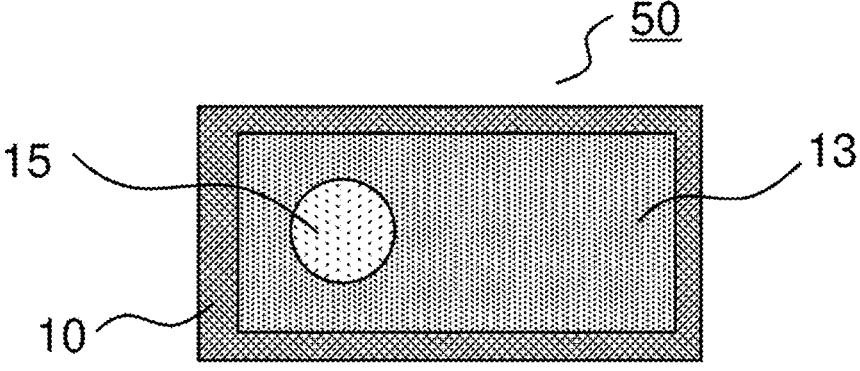
FIG. 2C is a bottom view for explaining the example of the to-be-inspected object used for the appearance inspection method for goods according to embodiment 1.

The infrared sensor module is configured to have two surfaces which are: a surface (front surface) on which, as shown in FIG. 2A and FIG. 2B, a chip part 11 such as a resistor or a capacitor and an external-connection connector 12 are connected to a printed wiring board 10 through soldering; and a surface (back surface) on which, as shown in FIG. 2B and FIG. 2C, a sensor chip and an application specific integrated circuit (ASIC) for controlling a signal are connected by using an adhesive 14 and a wire (not shown), and these components are covered with a lens cap 13 holding a lens 15.

In appearance inspection, presence/absence of foreign matter, a flaw, chipping, a crack, or the like on both surfaces, i.e., the front surface and the back surface described above, needs to be checked (hereinafter, a plane parallel to said both surfaces is also referred to as "X-Y plane"). When the infrared sensor module is actually used, a connector for external connection is connected to use the infrared sensor module. However, at the time of characteristic inspection in a manufacturing process, it takes time to perform work of attaching and detaching such a connector, resulting in inefficiency. Considering this, the characteristic inspection is performed with a probe being in contact with a terminal of the connector without connecting such a connector.

Therefore, even in a case where the shape of the connector is deformed, the infrared sensor module is normally operated at the time of the characteristic inspection since a probe is connected. Meanwhile, in the case where the shape of the connector is deformed, a problem that a connector cannot be connected and the infrared sensor module cannot be normally used might arise when the infrared sensor module is actually used after being shipped as a product. Also, in a case where the inside of the lens cap 13 is required to be airtight, the adhesive 14 between the printed wiring board 10 and the lens cap 13 needs to have been effectively applied on the entire periphery so as to fix the printed wiring board 10 and the lens cap 13 to each other.

Considering the above facts, for example, the infrared sensor module needs to be subjected to appearance inspection on not only both surfaces, i.e., the front surface and the back surface, of the printed wiring board 10, but also four side surfaces thereof as surfaces other than said both surfaces (hereinafter, simplified as, i.e., simply referred to as, "four side surfaces" as well). In order not to scratch the lens 15 allowing transmission of only infrared rays therethrough and in order not to apply any external force to the lens cap 13, the chip part 11, or the like, an area excluding these components (an area set away from these components so as not to apply any external force thereto; hereinafter, this area is referred to as "contact-allowed area") is set in a limited manner.

The present appearance inspection device is employed for inspecting a product that has a limited contact area and that requires appearance inspection to be performed on six surfaces thereof including the four side surfaces described above. That is, the product to be inspected by the present appearance inspection device is not limited to infrared sensor modules as long as the product has the above characteristics.

Here, a tray 1 shown in FIG. 1 only has to be a tray in which a semiconductor package 50 (as a to-be-inspected product) represented by an infrared sensor module can be mounted, the semiconductor package 50 having: front and back sides between which the shape differs; and a limited contact-allowed area. As such a tray 1, for example, a tray formed from a colorless and transparent material such as amorphous polyethylene terephthalate (A-PET) and provided with a plurality of pockets 2 such that to-be-inspected objects (specifically, for example, a plurality of the semiconductor packages 50) can be accommodated therein, is used.

Each of the pockets 2 is a portion configured such that the corresponding semiconductor package 50 as a to-be-inspected object is fixed so as not to be moved in the pocket at the time of appearance inspection or the like. The pocket 2 has such a structure that the contour thereof has a shape extending along the outer periphery of the semiconductor package.

In addition, designing is performed such that: in an area for supporting the semiconductor package at an outer peripheral portion thereof through contact with the semiconductor package, a support 3 which supports the semiconductor package is provided correspondingly to a part of the contact-allowed area of the semiconductor package; and meanwhile, a space for preventing contact with the tray 1 is provided correspondingly to a contact-prohibited area which is an area of the semiconductor package other than the contact-allowed area. The number of rows (in other words, the number of the pockets 2) in the tray 1 is not particularly limited and is defined according to the size of the appearance inspection device (or the tray itself), the sizes of the to-be-inspected objects, or the like. Such a tray 1 is disposed at a predetermined position in the appearance inspection device.

A camera 4 which takes images of the front surfaces of a plurality of to-be-inspected objects mounted in the tray is disposed above the tray 1 so as to face downward. Meanwhile, a camera 5 which takes images of the back surfaces of the plurality of to-be-inspected objects is disposed below the tray 1 as well so as to face upward. A charge-coupled device (CCD) camera is generally used as each of these cameras, and the number of pixels necessary for the CCD camera is determined according to a resolution or an angle of view (here, meaning a range in which a clear image is obtained by a lens system of the camera) which are required for appearance inspection.

Between the tray 1 and each of the cameras disposed above and below the tray 1, a lighting device is disposed outside of the angle of view of the camera (so as not to be present within the angle of view of the camera) in order to take an image such that a portion to be viewed is further emphasized by whitening or blackening the color of each of the to-be-inspected objects or the color of a portion to be detected. This lighting device is selected according to the shape or the size of the to-be-inspected object or an irradiation method for the to-be-inspected object.

Actions of Embodiment 1

For performing appearance inspection by using such an appearance inspection device, the tray 1 accommodating semiconductor packages is disposed on an inspection stage 6 first. The disposition may be performed through a method that includes automatically cutting out one of stacked said trays 1 or a method that includes manually mounting the trays 1 one by one. The inspection stage 6 has a region corresponding to an area, of the tray 1, that is mounted with the products, the region being provided with a hole through which the back surfaces can be imaged by the camera 5 disposed below the tray 1. The inspection stage 6 further has a region corresponding to an outer peripheral portion of the tray 1 (i.e., a peripheral portion, of the tray 1, that is mounted with no to-be-inspected products), the region being a portion other than the hole, the region being in contact with the tray 1, the region being the only region supporting the tray 1.

After the tray 1 is disposed on the inspection stage 6, the front surface of each of the to-be-inspected objects is imaged under necessary lighting conditions correspondingly to the number of the necessary lighting conditions by the camera 4 disposed above the tray 1 so as to face downward, to inspect the to-be-inspected product. In a case where the camera having been disposed and being used has an angle of view covering the entire region of the tray and can perform imaging at a necessary resolution, all the to-be-inspected objects disposed in the front surface can be collectively imaged, and therefore, can be collectively inspected for each of the lighting conditions. In a case where the angle of view is limited, inspection may be performed with the inspection region being divided into segments each corresponding to the quantity of to-be-inspected objects capable of being collectively imaged. In this case, along the X-Y plane, the camera 4 may be moved, or the inspection stage 6 may be moved.

In addition, the back surface of each of the to-be-inspected objects is, in the same manner as the front surface, also imaged under necessary lighting conditions correspondingly to the number of the necessary lighting conditions by the camera 5 disposed below the tray 1 so as to face upward, to inspect the to-be-inspected object. At this time, since a supporting portion 3 (substrate surface; hereinafter, also referred to as "support 3"), of the tray 1, that supports each of the infrared sensor modules and a bottom surface portion 7 of the corresponding pocket in the tray are colorless and transparent, the to-be-inspected object can be inspected without being moved, even though the tray 1 is disposed between the to-be-inspected object and the camera 5. At the time of this inspection as well, in a case where the camera having been disposed has an angle of view covering the entire region of the tray and can perform imaging at a necessary resolution, all the disposed to-be-inspected objects can be collectively imaged and inspected for each of the lighting conditions. In a case where the angle of view is limited, inspection may be performed with the inspection region being divided into segments each corresponding to the quantity of to-be-inspected objects capable of being collectively imaged. In this case, along the X-Y plane, the camera 5 may be moved, or the inspection stage 6 may be moved. Here, the above camera 4 and camera 5 are also referred to as "first cameras" (the same applies below).

The bottom surface portion 7 of each of the pockets in the tray is not the supporting portion for the corresponding to-be-inspected object. Thus, when only a necessary portion is cut out of the bottom surface portion 7 so as to form a space, a clearer image can be taken without interference between the tray 1 and the to-be-inspected object. After imaging of the front surfaces and the back surfaces of the to-be-inspected objects by the camera 4 and the camera 5 is completed, the infrared sensor modules are transported to a side-surface inspection stage 8 one by one, and side-surface inspection is performed by a side-surface camera 9 (hereinafter, the side-surface camera is also referred to as "second camera"). In the side-surface inspection, the four side surfaces need to be imaged, and thus the side-surface inspection stage 8 is rotated by 90 degrees each time as indicated by an arrow in the drawing, and imaging is performed upon each time of rotation. As a matter of course, the side-surface inspection may be performed with the number of the provided side-surface cameras being set to two or four.

Figure 3:
FIG. 3 is a diagram for explaining another example of the appearance inspection device used for the appearance inspection method for goods according to embodiment 1.

In addition, as shown in FIG. 3, the bottom surface portion 7 of each of the pockets in the tray may be partially formed in a lens shape 16 (the condition of being transparent is included as a prerequisite; here, the lens shape specifically refers to the shape of a convex lens; and the same applies below). Consequently, a fine portion of the corresponding to-be-inspected object can be magnified, whereby a smaller imperfect portion thereof can be detected.

Advantageous Effects of Embodiment 1

The tray 1 to be used is designed such that: the tray formed from a colorless and transparent material is provided with the plurality of pockets 2; the supports 3 are provided such that to-be-inspected objects are supported so as not to be moved in the respective pockets, each support 3 extending along the shape of the corresponding to-be-inspected object and being located correspondingly to only the contact-allowed area of the to-be-inspected object; and a space such as one described above is provided correspondingly to the contact-prohibited area of the to-be-inspected object so as to prevent contact. In addition, above and below this tray 1, the respective cameras are disposed. With such a configuration, the front surface of each of the to-be-inspected objects can be inspected by the camera 4 on the upper side and the back surface of the to-be-inspected object can be inspected by the camera 5 on the lower side such that the inspections of these plurality of surfaces are simultaneously performed, and each of the to-be-inspected objects can be inspected at the same position without transporting the to-be-inspected object between the front surface inspection and the back surface inspection and without exchanging trays for the to-be-inspected object. Therefore, a takt-shortening effect is expected to be exhibited.

In addition, the tray serves as a member to be mounted with the to-be-inspected objects, and thus, even in a case where the to-be-inspected objects are other products having different shapes, a tray corresponding to the other products only has to be provided, and the other products can be easily inspected. In addition, after the to-be-inspected objects are mounted in the trays, transport or disposition on the stage is performed tray by tray, and this eliminates the need for direct contact with any of the to-be-inspected objects at the time of inspection, whereby generation of flaws due to direct contact with any of the to-be-inspected objects, and the like are also suppressed.

Embodiment 2

An appearance inspection device used for an appearance inspection method for goods according to embodiment 2 will be described with reference to the following drawings.

Figure 4B:
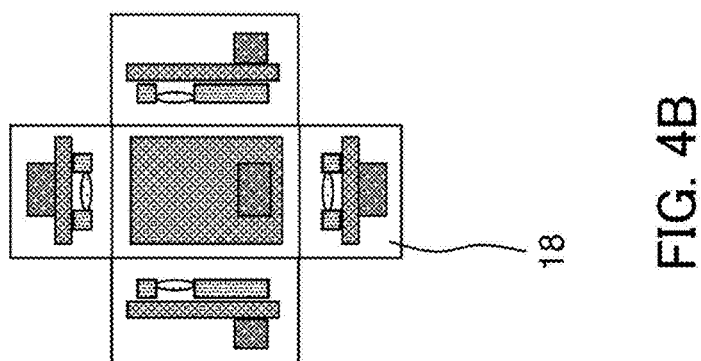
FIG. 4B is a top view showing the example of the appearance inspection device used for the appearance inspection method for goods according to embodiment 2.
Figure 4A:
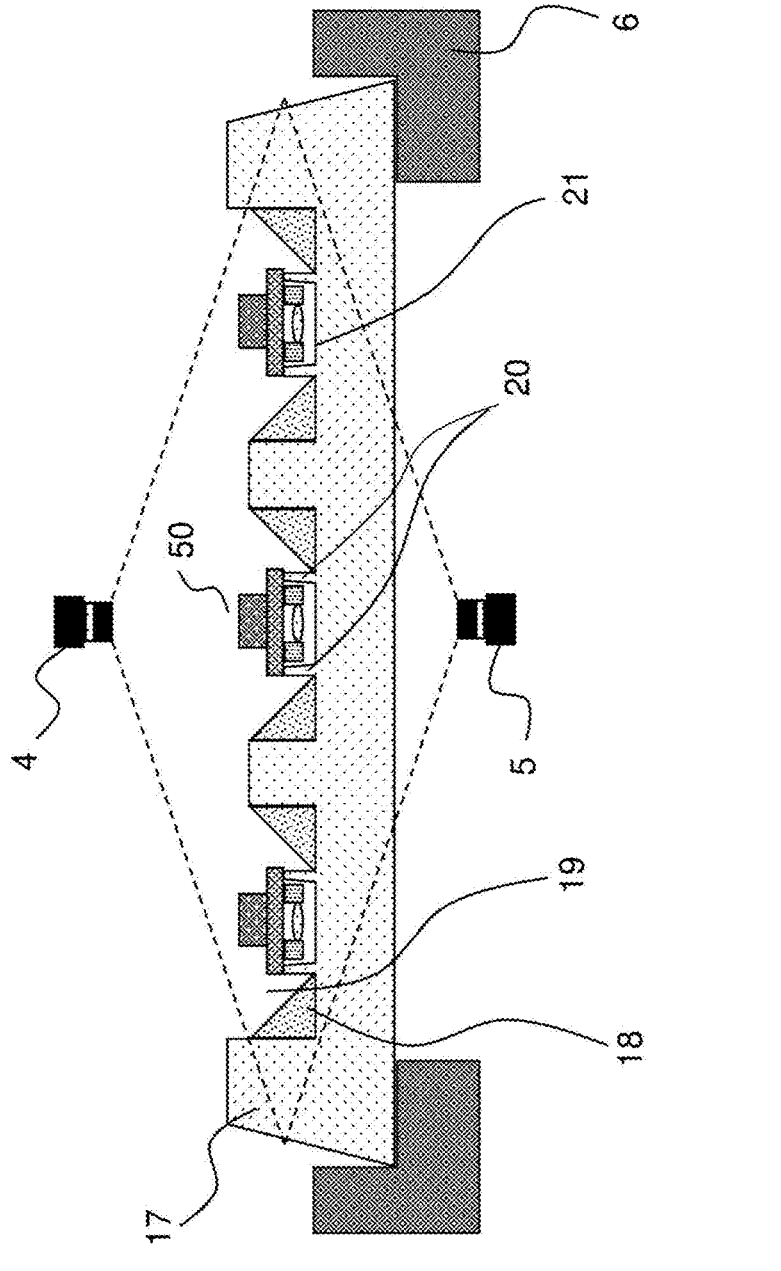
FIG. 4A is a side view showing an example of an appearance inspection device used for an appearance inspection method for goods according to embodiment 2.
Figures 5A, 5B:
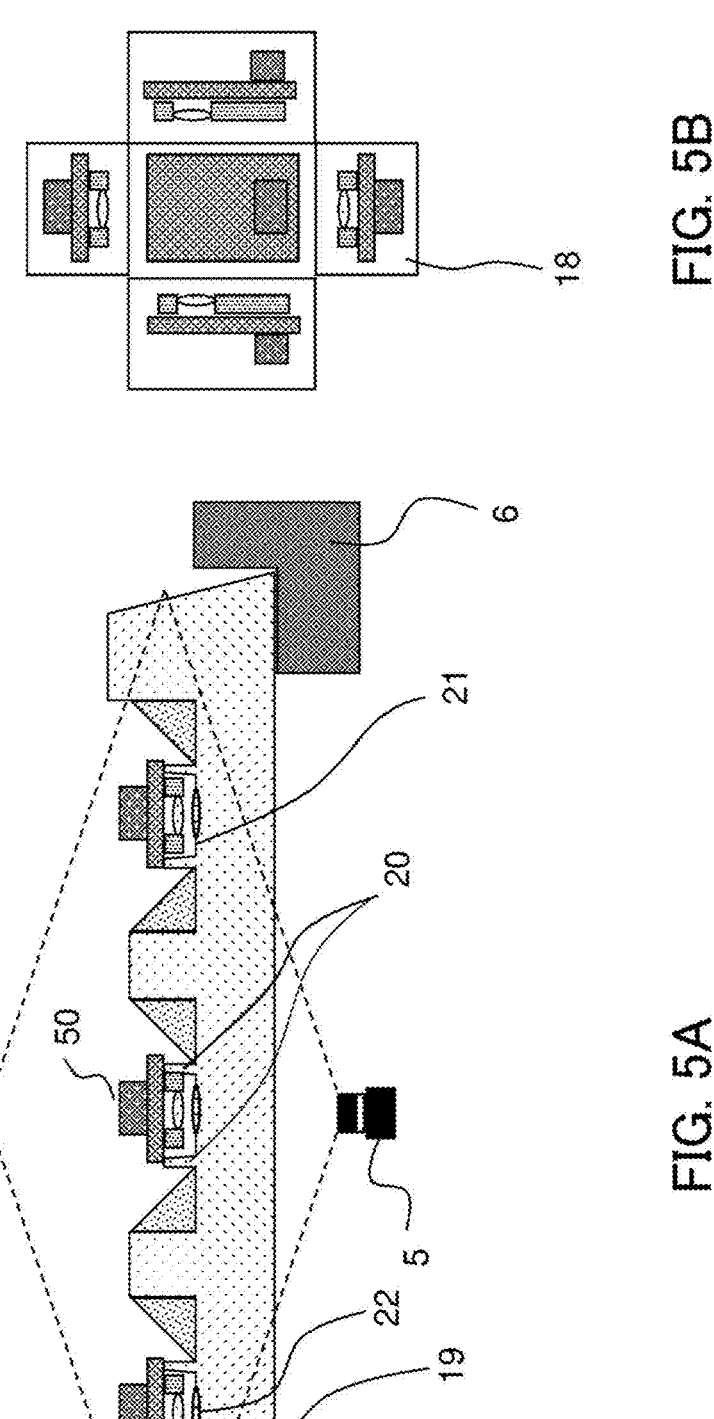
FIG. 5A is a side view showing another example of the appearance inspection device used for the appearance inspection method for goods according to embodiment 2.
FIG. 5B is a top view showing the other example of the appearance inspection device used for the appearance inspection method for goods according to embodiment 2.

FIG. 4A and FIG. 4B are respectively a side view and a top view showing an example of the appearance inspection device used for the appearance inspection method for goods according to embodiment 2. FIG. 5A and FIG. 5B are respectively a side view and a top view showing another example of the appearance inspection device used for the appearance inspection method for goods according to embodiment 2.

As shown in FIG. 4A, a tray 17 being used has pockets each having side surfaces (orthogonal to the X-Y plane) on four respective sides. On each of the four sides, a mirror 18 for reflecting and showing (an image of) the corresponding side surface of a to-be-inspected object upward is disposed. Here, the number of rows of the pockets is not particularly limited and is defined according to the size of the appearance inspection device (or the tray itself), the size of the to-be-inspected object, or the like. The other features are the same as those in embodiment 1.

FIG. 4B is a top view showing one of the to-be-inspected objects (such as sensor modules) shown in FIG. 4A. It can be seen from FIG. 4B that, since the mirrors 18 are disposed, not only the front surface but also the four side surfaces of the to-be-inspected object can be imaged by the camera 4 disposed on the front surface side of the tray. The arrangement, the specifications, and the like of the cameras and the lighting devices are the same as those in embodiment 1, and thus will not be described in detail here.

Actions of Embodiment 2

For performing appearance inspection on to-be-inspected objects by using such an appearance inspection device, the tray 17 accommodating semiconductor packages is disposed on the inspection stage 6 first. The disposition may be performed through a method that includes automatically cutting out one of stacked said trays 17 or a method that includes manually mounting the trays 17 one by one. The inspection stage 6 has a region corresponding to an area, of the tray 17, that is mounted with the to-be-inspected products, the region being provided with a hole through which the back surfaces can be imaged by the camera 5 disposed below the tray 17. The inspection stage 6 further has a region corresponding to a peripheral area, of the tray, that is mounted with no to-be-inspected products, the region being the only region supporting the tray 17.

After the tray 17 is disposed on the inspection stage 6, the front surface of each of the to-be-inspected objects is imaged under necessary lighting conditions correspondingly to the number of the necessary lighting conditions by the camera 4 disposed above the tray 17 so as to face downward, to perform inspection.

At this time, in each of pockets 19 mounted with the corresponding to-be-inspected object, the side surfaces of the to-be-inspected object are shown upward by the mirrors 18 disposed on the surfaces, on the four sides of the pocket, that face the respective side surfaces of the to-be-inspected object. Consequently, the four side surfaces of the to-be-inspected object can also be simultaneously imaged by the camera 4, to perform inspection.

Here, the camera having been disposed has an angle of view covering the entire region of the tray, and thus, in a case where the camera can perform imaging at a necessary resolution, all the to-be-inspected objects in the entire region of the tray can be collectively imaged and inspected for each of the lighting conditions. In a case where the angle of view does not cover the entire region of the tray and is limited to a part of the entire region, inspection may be performed with the inspection region being divided into segments each corresponding to the quantity of to-be-inspected objects capable of being collectively imaged.

In this case, along the X-Y plane, the camera 4 may be moved, or the inspection stage 6 may be moved.

In addition, the back surface of each of the to-be-inspected objects is, in the same manner as the front surface, also imaged under necessary lighting conditions correspondingly to the number of the necessary lighting conditions by the camera 5 disposed below the tray 17 so as to face upward, to inspect the to-be-inspected object.

Since a supporting portion 20 (substrate surface; hereinafter, also referred to as "support 20"), of the tray 17, that supports each of the to-be-inspected objects and a bottom surface portion 21 of the corresponding pocket in the tray are colorless and transparent, the to-be-inspected object can be inspected without transporting the product even though a part of the tray 17 is present at a position, between the to-be-inspected object and the camera 5 (within the angle of view), at which interference of both the to-be-inspected object and the camera 5 occurs.

At the time of this inspection as well, in a case where the camera having been disposed has an angle of view covering the entire region of the tray 17 and can perform imaging at a necessary resolution, all the to-be-inspected objects can be collectively imaged and inspected for each of the lighting conditions.

In a case where the angle of view of the camera is limited, the imaging region may be divided into segments each corresponding to the quantity of to-be-inspected objects capable of being collectively imaged. In this case, along the X-Y plane, the camera 5 may be moved, or the inspection stage 6 may be moved.

The bottom surface portion 21 of each of the pockets in the tray is not the supporting portion for the corresponding to-be-inspected object. Thus, when a necessary portion is cut out of the bottom surface portion 21, no interfering object is present between the tray and the to-be-inspected object, whereby a clearer image can be taken.

In addition, as shown in FIG. 5A, the bottom surface portion 21 of each of the pockets in the tray may be partially formed in a lens shape 22 (the condition of being transparent is included as a prerequisite). Consequently, a fine portion of the corresponding to-be-inspected object can be magnified, whereby a smaller imperfect portion thereof can be detected. In this case, similar to the above FIG. 4B, FIG. 5B is a top view showing one of the to-be-inspected objects (such as sensor modules).

In embodiment 1, after inspection of the front surfaces and the back surfaces of the to-be-inspected objects is completed, the to-be-inspected objects are transported to the side-surface inspection stage 8 one by one, and side-surface inspection is performed on each of the to-be-inspected objects. Meanwhile, in embodiment 2, the four side surfaces of each of the to-be-inspected objects can be inspected simultaneously with the front surface thereof, whereby side-surface inspection that is performed by the side-surface inspection stage and that involves transport becomes unnecessary.

Advantageous Effects of Embodiment 2

The tray 17 to be used is designed such that: the tray 17 is formed from a colorless and transparent material and is provided with the plurality of pockets 19; the supports 20 (also referred to as "supporting portions 20") are provided so as not to move to-be-inspected objects in the respective pockets, each support 20 having a shape extending along the outer periphery of the corresponding to-be-inspected object and being located correspondingly to only the contact-allowed area of the to-be-inspected object; a space is provided correspondingly to the contact-prohibited area of the to-be-inspected object so as to prevent contact; and furthermore, each of the pockets 19 has four sides on which the respective mirrors 18 are disposed. In addition, above and below this tray 17, the respective cameras are disposed. Thus, inspection of the front surface and the four side surfaces of each of a plurality of to-be-inspected objects by the camera 4 on the upper side, and inspection of the back surface of each of the plurality of to-be-inspected objects by the camera 5 on the lower side, can be simultaneously and collectively performed, and, at the time of performing inspection of the front surface and the four side surfaces and inspection of the back surface, the to-be-inspected object can be inspected at a position that remains the same between these inspections, without transporting the to-be-inspected object. Therefore, a takt-shortening effect is expected to be exhibited.

Furthermore, it becomes unnecessary to perform work of transport to the side-surface inspection stage in order to perform side-surface inspection on the to-be-inspected object. Therefore, it is also possible to suppress generation of flaws due to direct contact, with the to-be-inspected object, that might occur in association with exchange between trays or transport of a tray.

Moreover, similar to embodiment 1, appearance inspection is performed with to-be-inspected objects being mounted in a tray, and thus, even in the case of adaptation to other products as to-be-inspected objects having different shapes, appearance inspection can be easily performed on the other products by changing to a tray corresponding to the shapes of the other products and using this post-changing tray.

Embodiment 3

An appearance inspection device used for an appearance inspection method for goods according to embodiment 3 will be described with reference to the following drawings.

Figures 6A, 6B:
FIG. 6A is a top view showing an example of an appearance inspection device used for an appearance inspection method for goods according to embodiment 3.
FIG. 6B is a side view showing the example of the appearance inspection device used for the appearance inspection method for goods according to embodiment 3.
Figures 7A, 7B:
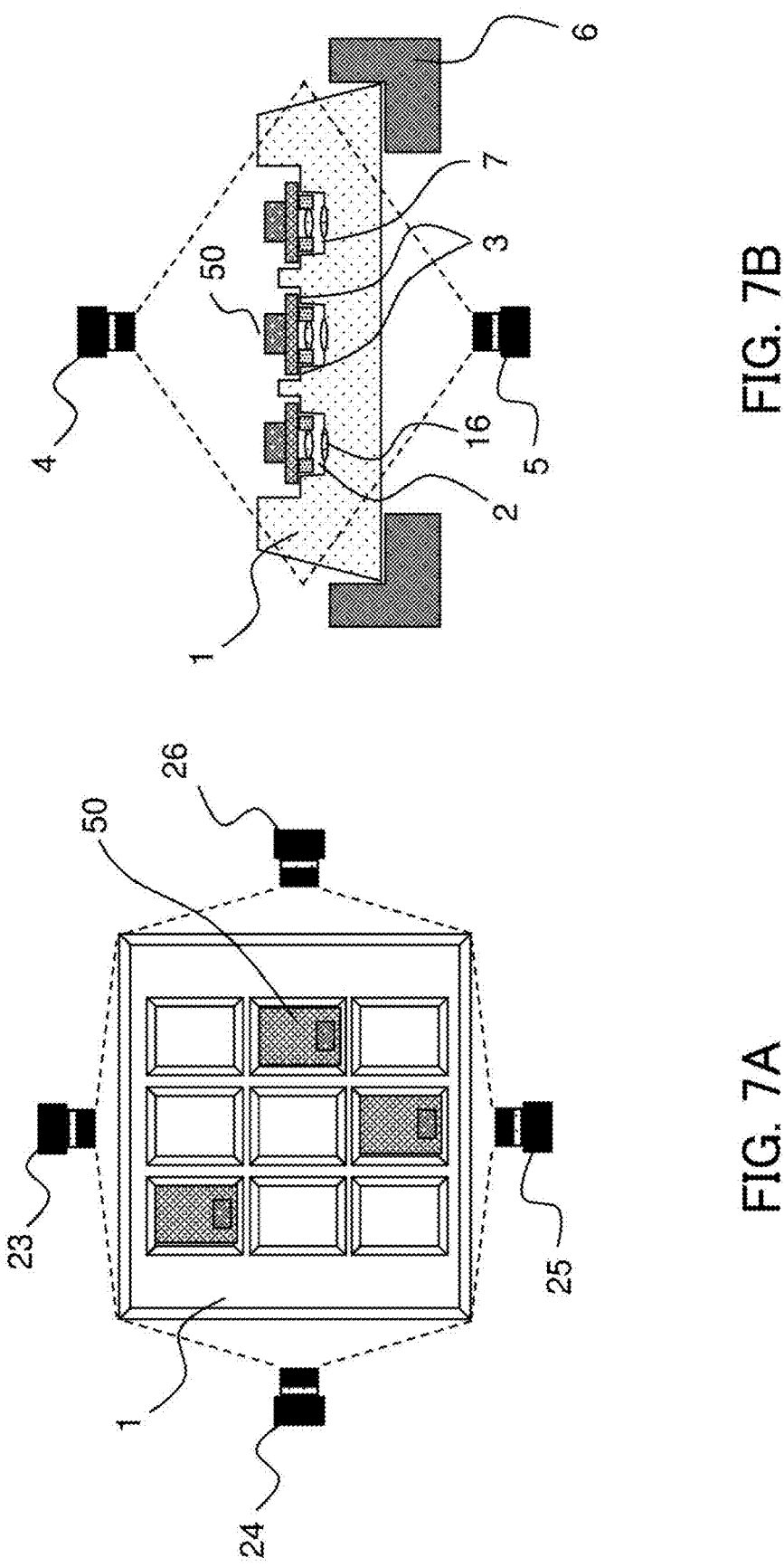
FIG. 7A is a top view showing another example of the appearance inspection device used for the appearance inspection method for goods according to embodiment 3.
FIG. 7B is a side view showing the other example of the appearance inspection device used for the appearance inspection method for goods according to embodiment 3.

FIG. 6A and FIG. 6B are respectively a top view and a side view showing an example of the appearance inspection device used for the appearance inspection method for goods according to embodiment 3. FIG. 7A and FIG. 7B are respectively a top view and a side view showing another example of the appearance inspection device used for the appearance inspection method for goods according to embodiment 3. The tray 1 being used in this embodiment is assumed to have a front surface in which a plurality of pockets are formed in the same manner as in the tray described in embodiment 1. However, the plurality of pockets in this embodiment are formed so as to be arranged in a grid pattern as shown in FIG. 6A.

In embodiment 1, the cameras which take images of the front surfaces and the back surfaces of a plurality of to-be-inspected objects are disposed above and below the tray 1. Meanwhile, in embodiment 3, in order to collectively take images of the four side surfaces of each of a plurality of to-be-inspected objects in directions toward the four respective side surfaces of the tray 1, side-surface cameras 23 to 26 are disposed correspondingly to the respective side surfaces in addition to the above two cameras as shown in FIG. 6A (specifically, the side-surface camera 23 is disposed correspondingly to a side surface on the upper side of FIG. 6A, the side-surface camera 24 is disposed correspondingly to a side surface on the left side of FIG. 6A, the side-surface camera 25 is disposed correspondingly to a side surface on the lower side of FIG. 6A, and the side-surface camera 26 is disposed correspondingly to a side surface on the right side of FIG. 6A). Therefore, these cameras are combined with the two cameras shown in FIG. 6B (i.e., the camera 4 disposed on the front surface side of the tray and the camera 5 disposed on the back surface side of the tray) so that a total of six cameras are disposed to achieve the adaptation.

Similar to embodiment 1, a CCD camera is generally used as each of these six cameras as well, and the number of pixels necessary for the camera is determined according to the resolution or the angle of view which are required for appearance inspection.

In addition, between the tray 1 and each of the above six cameras, a lighting device is disposed outside of the angle of view of the camera in order to take an image such that a portion to be viewed is further emphasized as a result of making a change by whitening or blackening the color of each of the to-be-inspected objects or the color of a portion to be detected, in the same manner as in embodiments 1 and 2. This lighting device is selected according to the shape or the size of the to-be-inspected object or the irradiation method for the to-be-inspected object.

Actions of Embodiment 3

In such an appearance inspection device, the tray 1 accommodating to-be-inspected objects such as semiconductor packages is disposed on the inspection stage 6 as shown in FIG. 6B. The semiconductor packages in the tray 1 are arranged such that one of the semiconductor packages is present per row and such that only one of the semiconductor packages is present in a same row as seen in any of the directions toward the four side surfaces (see FIG. 6A and FIG. 6B).

The tray 1 may be disposed through a method that includes automatically cutting out one tray from a group of stacked said trays 1 or a method that includes manually taking out the trays 1 one by one. Here, the inspection stage 6 has a region corresponding to an area, of the tray 1, that is mounted with the to-be-inspected products, the region being provided with a hole through which the to-be-inspected objects can be collectively imaged from the back surfaces thereof by the camera 5 disposed below the tray 1. The inspection stage 6 further has a region corresponding to a peripheral area as an outer peripheral portion, of the tray 1, that is mounted with no to-be-inspected products, the region being the only region supporting the tray 1.

After the tray 1 is disposed on the inspection stage 6, the front surface of each of the to-be-inspected objects is imaged under necessary lighting conditions correspondingly to the number of the necessary lighting conditions by the camera 4 disposed above the tray 1 so as to face downward and by also using the corresponding irradiation device simultaneously, to perform appearance inspection on the to-be-inspected object. In a case where the camera having been disposed has an angle of view covering the entire region of the tray 1 and can perform imaging at a necessary resolution, all the to-be-inspected objects can be collectively imaged and inspected for each of the lighting conditions. In a case where the angle of view is limited, the imaging region may be divided into segments each corresponding to the quantity of to-be-inspected objects capable of being collectively imaged. In this case, along the X-Y plane, the camera 4 may be moved, or the inspection stage 6 may be moved.

In addition, the back surface of each of the to-be-inspected objects is, in the same manner as the front surface, also imaged under necessary lighting conditions correspondingly to the number of the necessary lighting conditions by the camera 5 disposed below the tray 1 so as to face upward, to inspect the to-be-inspected object. Since the supporting portion 3 (substrate surface; also referred to as "support 3"), of the tray 1, that supports each of the infrared sensor modules as to-be-inspected objects and the bottom surface portion 7 of the corresponding pocket formed in the tray are colorless and transparent, the to-be-inspected object can be inspected without being transported, even though the tray 1 is disposed between the to-be-inspected object and the camera 5 so as to cause interference of both the to-be-inspected object and the camera 5.

At this time as well, in a case where the camera having been disposed has an angle of view covering the entire region of the tray 1 and can perform imaging at a necessary resolution, all the to-be-inspected objects can be collectively imaged and inspected for each of the lighting conditions. In a case where the angle of view is limited, the region to be imaged may be divided into segments each corresponding to the quantity of to-be-inspected objects capable of being collectively imaged. In this case, along the X-Y plane, the camera 5 may be moved, or the inspection stage 6 may be moved.

The bottom surface portion 7 of each of the pockets in the tray is not the supporting portion for the corresponding to-be-inspected object. Thus, when cutting is performed (so as to form a space), no portion that interferes with the tray 1 or the to-be-inspected object is present between the tray 1 and the to-be-inspected object, whereby a clearer image can be taken.

In addition, as shown in FIG. 7B, the bottom surface portion 7 of each of the pockets in the tray may be partially formed in the lens shape 16 (the condition of being transparent is included as a prerequisite). Consequently, a fine portion of the corresponding to-be-inspected object can be magnified and inspected, whereby a smaller imperfect portion thereof can be detected. The same description as that given in relation to the case explained with reference to FIG. 6A also applies to the side surfaces. That is, as shown in FIG. 7A, the side surfaces of each of the to-be-inspected objects can be imaged under necessary lighting conditions correspondingly to the number of the necessary lighting conditions by the side-surface cameras 23 to 26 disposed for imaging the respective side surfaces, to perform inspection.

In a case where the camera having been disposed has an angle of view covering the entire region of the tray and can perform imaging at a necessary resolution, all the to-be-inspected objects can be collectively imaged and inspected for each of the lighting conditions. In a case where the angle of view of the camera is limited, the region may be divided into segments each corresponding to the quantity of to-be-inspected objects capable of being collectively imaged. In this case, along the X-Y plane, the side-surface cameras 23 to 26 may be moved, or the inspection stage 6 may be moved.

Advantageous Effects of Embodiment 3

The tray 1 is designed such that: the tray formed from a colorless and transparent material is provided with the plurality of pockets 2; the supports 3 (also referred to as "supporting portions 3") are provided such that to-be-inspected objects are supported so as not to be moved in the respective pockets 2, each support 3 having a shape extending along the outer periphery of the corresponding to-be-inspected object and being located correspondingly to only the contact-allowed area of the to-be-inspected object; and a space is provided correspondingly to the contact-prohibited area of the to-be-inspected object so as to prevent contact with the to-be-inspected object. In this tray 1, the to-be-inspected objects such as semiconductor packages are placed such that one of the to-be-inspected objects is disposed per row and such that only one of the semiconductor packages is disposed in a same row as seen in any of the directions toward the four side surfaces (see FIG. 7A), and the cameras are disposed on all the six respective sides (a total of six sides which are the upper side, the lower side, and the above four side surface sides of the tray 1) of the tray 1.

By arranging the cameras as described above, the front surface of each of the to-be-inspected objects can be inspected by the camera 4 on the upper side, the back surface of the to-be-inspected object can be inspected by the camera 5 on the lower side, and the four side surfaces of the to-be-inspected object can be inspected by the side-surface cameras 23 to 26 on the four respective side surface sides such that the inspections of these plurality of surfaces are simultaneously performed. Thus, inspection of the front surface, the back surface, and the four side surfaces can be performed on each of all the to-be-inspected objects without transporting the to-be-inspected object and without changing the disposition position of the to-be-inspected object from the initially disposed position. Therefore, a takt-shortening effect for appearance inspection is expected to be exhibited.

In addition, similar to embodiment 1, the tray serves as a member to be mounted with the to-be-inspected objects, and thus, even in the case of adaptation to appearance inspection for other products as to-be-inspected objects having different shapes, the appearance inspection can be easily achieved just by changing to another tray corresponding to the other products.

Embodiment 4

An appearance inspection device used for an appearance inspection method for goods according to embodiment 4 will be described with reference to the following drawings.

Figures 8A, 8B:
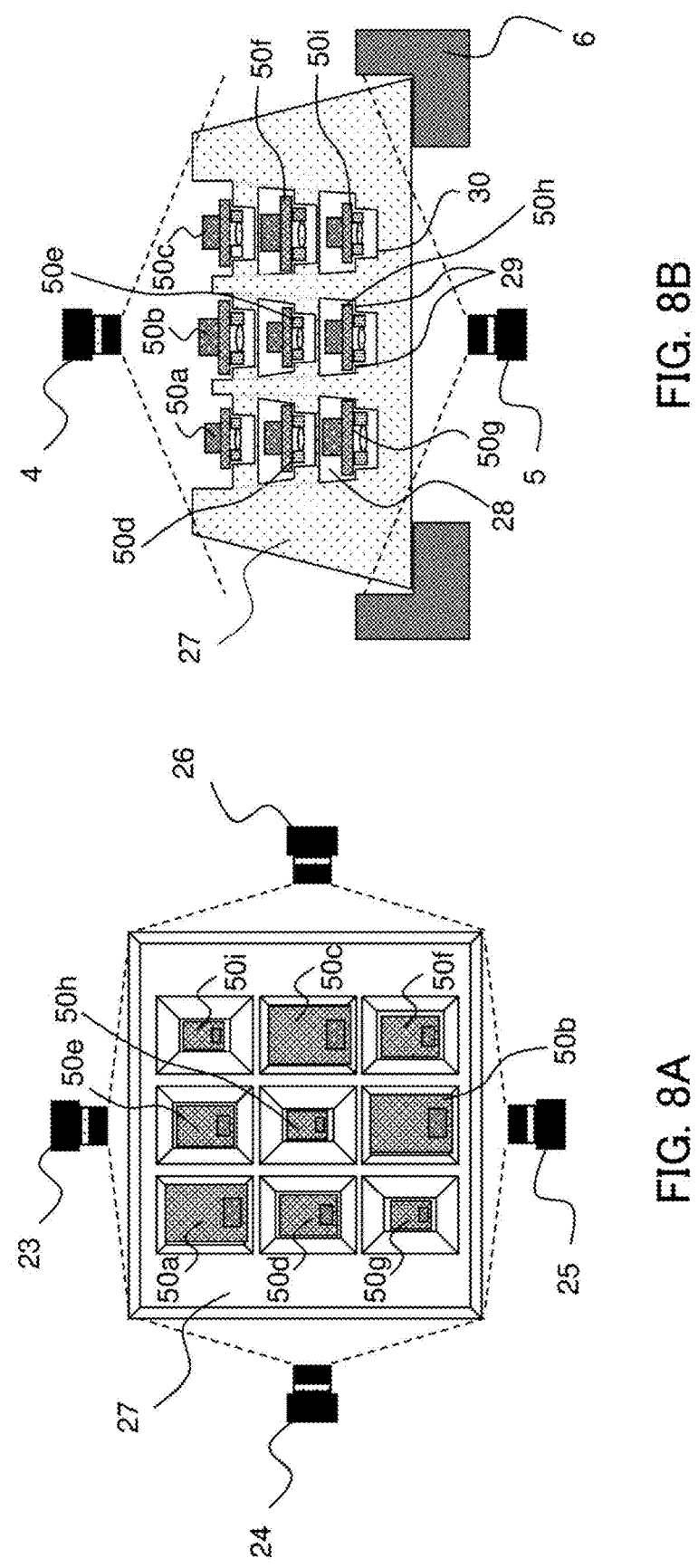
FIG. 8A is a top view showing an example of an appearance inspection device used for an appearance inspection method for goods according to embodiment 4.
FIG. 8B is a side view showing the example of the appearance inspection device used for the appearance inspection method for goods according to embodiment 4.
Figures 9A, 9B:
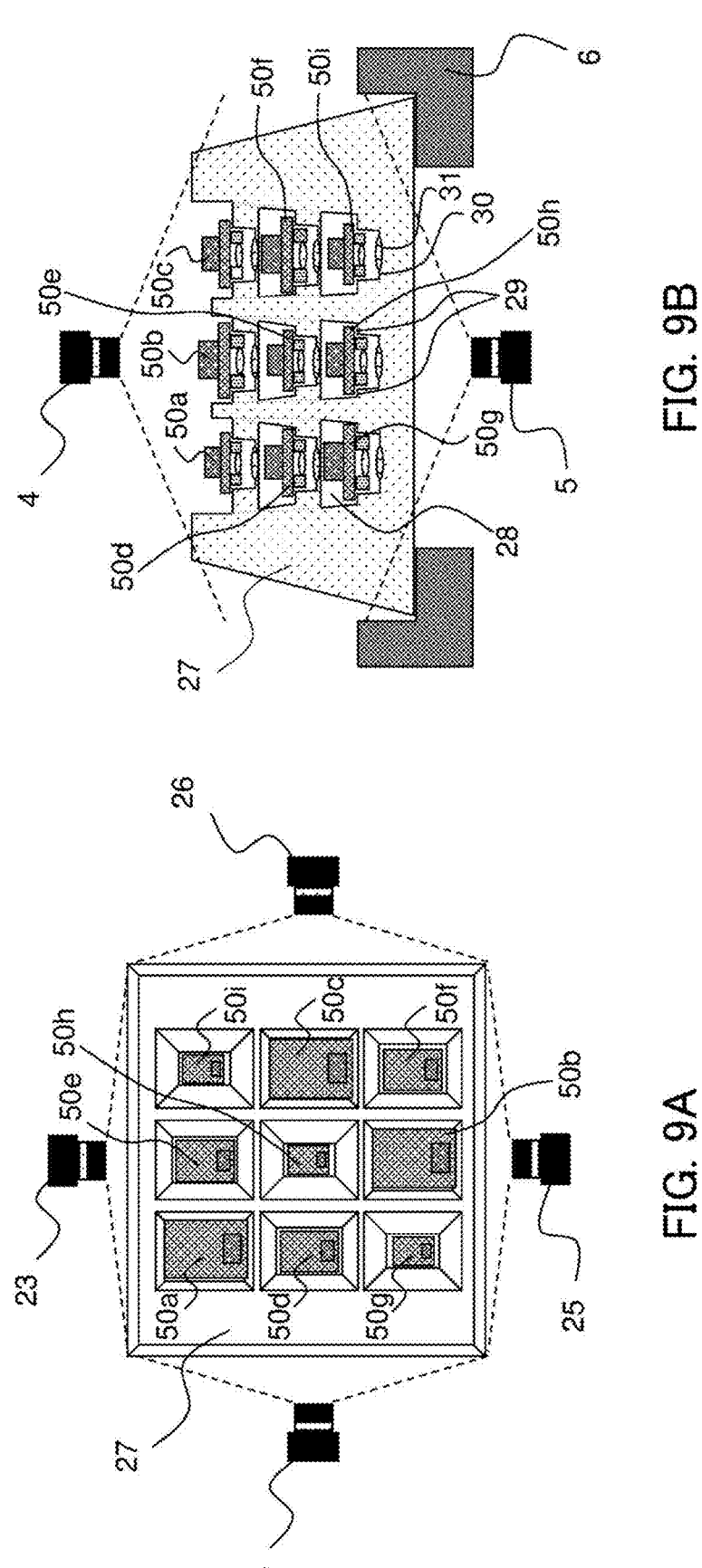
FIG. 9A is a top view showing another example of the appearance inspection device used for the appearance inspection method for goods according to embodiment 4.
FIG. 9B is a side view showing the other example of the appearance inspection device used for the appearance inspection method for goods according to embodiment 4.

FIG. 8A and FIG. 8B are respectively a top view and a side view, as seen from the side-surface camera 25, that show an example of the appearance inspection device used for the appearance inspection method for goods according to embodiment 4. FIG. 9A and FIG. 9B are respectively a top view and a side view, as seen from the side-surface camera 25, that show another example of the appearance inspection device used for the appearance inspection method for goods according to embodiment 4.

A tray 27 being used in this embodiment has pockets 28 assumed to have shapes that are correspondingly set by, for example, forming the pocket 28 in mutually different depths/sizes such that the to-be-inspected objects (reference positions thereof, e.g., the height positions of the front surfaces of the printed wiring boards) are at different heights in a same row as seen in any of the upward, downward, leftward, and rightward directions in FIG. 8A. That is, the pockets in the grid pattern are formed so as to have different depths in a same (or specific) longitudinal direction and in a same (or specific) lateral direction. Specifically, for example, a semiconductor package 50*a*, a semiconductor package 50*d*, and a semiconductor package 50*g* as to-be-inspected objects placed in the row on the left side as shown in FIG. 8A (in which a product on the nearer side is shown so as to look larger, and a product on the farther side is shown so as to look smaller, although the products have the same size) are respectively disposed at the uppermost position in the row on the left side, the middle height position in said row, and the lowermost position in said row in FIG. 8B (in which a product on the nearer side is shown so as to look larger, and a product on the farther side is shown so as to look smaller, although the products have the same size). This positional relationship is established also among a semiconductor package 50*b*, a semiconductor package 50*e*, and a semiconductor package 50*h* placed in the middle row and among a semiconductor package 50*c*, a semiconductor package 50*f*, and a semiconductor package 50*i* placed in the row on the right side (see FIG. 8A and FIG. 8B; the same applies to FIG. 9A and FIG. 9B).

The number of rows in the tray 27 is not particularly limited and is defined according to the size of the appearance inspection device (or the tray itself), the sizes of the to-be-inspected objects, or the like. The other features are the same as those in the case of embodiment 1, and thus will not be described in detail here.

Actions of Embodiment 4

Furthermore, as shown in FIG. 9B, a bottom surface portion 30 of each of the pockets in the tray may be partially formed in a lens shape 31 (the condition of being transparent is included as a prerequisite). Consequently, a fine portion of the corresponding to-be-inspected object can be magnified and inspected, whereby a smaller imperfect portion thereof can be detected. Regarding the side surfaces as well, as shown in FIG. 9A, the side surfaces of each of the to-be-inspected objects can be imaged under necessary lighting conditions correspondingly to the number of the necessary lighting conditions by the side-surface cameras 23 to 26 disposed for imaging the respective side surfaces, to perform appearance inspection. The actions other than the above actions are the same as those in embodiment 3, and thus will not be described in detail here.

Advantageous Effects of Embodiment 4

As shown in FIG. 8B and FIG. 9B, the tray 27 is designed such that: the tray 27 is formed from a colorless and transparent material and is provided with the plurality of pockets 28; each of the pockets is provided with a support 29 which supports only the contact-allowed area of a corresponding to-be-inspected object and which has a shape extending along the outer periphery of the to-be-inspected object, so as not to move the to-be-inspected object in the pocket 28; and the pocket 28 is provided with a space corresponding to the contact-prohibited area of the to-be-inspected object so as to prevent contact with the to-be-inspected object. In addition, the pockets 28 in this tray 27 being used are provided so as to have different heights in a same row as seen in any direction. Furthermore, the cameras are arranged on all the six respective sides of the tray 27. Consequently, the front surface of each of the to-be-inspected objects can be inspected by the camera 4 on the upper side, the back surface of the to-be-inspected object can be inspected by the camera 5 on the lower side, and the four side surfaces of the to-be-inspected object can be inspected by the side-surface cameras 23 to 26 on the respective side surface sides such that the inspections of these surfaces are simultaneously performed (see FIG. 8A and FIG. 9A). Thus, each of all the to-be-inspected objects can be subjected to appearance inspection of the to-be-inspected object through inspection of the front surface, the back surface, and the four side surfaces thereof, without transporting the to-be-inspected object and without changing the disposition position for inspecting the to-be-inspected object from the initially-set inspection position. Therefore, a takt-shortening effect for appearance inspection is expected to be exhibited.

In addition, similar to embodiment 1, the to-be-inspected objects are inspected in a state of being mounted in the tray, and thus, even in the case of adaptation to appearance inspection for other products as to-be-inspected objects having different shapes, the adaptation can be easily achieved just by changing to a tray corresponding to the other products.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1, 17, 27 tray
2, 19, 28 pocket
3, 20, 29 support (supporting portion)
4 camera (camera for taking image of front surface of to-be-inspected object)
5 camera (camera for taking image of back surface of to-be-inspected object)
6 inspection stage
7, 21, 30 bottom surface portion of pocket in tray
8 side-surface inspection stage
9, 23, 24, 25, 26 side-surface camera
10 printed wiring board
11 chip part
12 external-connection connector
13 lens cap
14 adhesive
15 lens
16, 22, 31 lens shape
18 mirror
50, 50a, 50b, 50c, 50d, 50e, 50f, 50g, 50h, 50i semiconductor package (to-be-inspected object)

The invention claimed is:

1. An appearance inspection method for goods, the method being for performing appearance inspection on a to-be-inspected object by using an appearance inspection device including:

a planar tray having a plurality of transparent pockets in which a plurality of the respective to-be-inspected objects are placed away from each other, each of the pockets having a support which, when the corresponding to-be-inspected object is placed in the pocket, supports the to-be-inspected object through contact with the to-be-inspected object so as to extend along an outer periphery of the to-be-inspected object;

a plurality of first cameras disposed away from each other on a front surface side and a back surface side of the planar tray, the first cameras being capable of collectively and simultaneously imaging the plurality of to-be-inspected objects from the front surface side and the back surface side of the tray; and a second camera capable of imaging the plurality of to-be-inspected objects from side surfaces of the planar tray other than the front surface and the back surface, wherein the pockets of the tray are formed in a grid pattern as seen from the front surface side, and the to-be-inspected objects are arranged such that one of the to-be-inspected objects is placed per specific longitudinal direction or lateral direction of the pockets in the grid pattern and such that only one of the to-be-inspected objects is placed in a same direction as seen from any of the side surfaces, and the plurality of to-be-inspected objects are imaged from the front surface side and the back surface side of the tray by the first cameras and are imaged from the side surfaces by the second camera such that the to-be-inspected objects are simultaneously imaged and inspected from the front surface, the back surface, and the side surfaces of the tray.

2. The appearance inspection method for goods, according to claim 1, wherein the pockets, of the tray, in the grid pattern are formed so as to have different depths in a same longitudinal direction and in a same lateral direction as seen from any of the side surfaces, and each of the to-be-inspected objects is placed in the corresponding pocket and is inspected.

3. The appearance inspection method for goods, according to claim 2, wherein the appearance inspection device further includes a lighting device which is selected according to a shape or a size of each of the to-be-inspected objects and which is disposed outside of an angle of view of each of the cameras, and each of side surfaces of the to-be-inspected object is imaged under a predetermined lighting condition, to perform appearance inspection.

4. The appearance inspection method for goods, according to claim 2, wherein each of the pockets has a bottom surface portion that is partially formed in a lens shape.

5. The appearance inspection method for goods, according to claim 4, wherein the appearance inspection device further includes a lighting device which is selected according to a shape or a size of each of the to-be-inspected objects and which is disposed outside of an angle of view of each of the cameras, and each of side surfaces of the to-be-inspected object is imaged under a predetermined lighting condition, to perform appearance inspection.

6. The appearance inspection method for goods, according to claim 1, wherein each of the pockets has a bottom surface portion that is partially formed in a lens shape.

7. The appearance inspection method for goods, according to claim 6, wherein the appearance inspection device further includes a lighting device which is selected according to a shape or a size of each of the to-be-inspected objects and which is disposed outside of an angle of view of each of the cameras, and each of side surfaces of the to-be-inspected object is imaged under a predetermined lighting condition, to perform appearance inspection.

8. The appearance inspection method for goods, according to claim 1, wherein the appearance inspection device further includes a lighting device which is selected according to a shape or a size of each of the to-be-inspected objects and which is disposed outside of an angle of view of each of the cameras, and each of side surfaces of the to-be-inspected object is imaged under a predetermined lighting condition, to perform appearance inspection.

9. An appearance inspection method for goods, the method being for performing appearance inspection on a to-be-inspected object by using an appearance inspection device including:

a planar tray having a plurality of transparent pockets in which a plurality of the respective to-be-inspected objects are placed away from each other, each of the pockets having a bottom surface portion that is partially formed in a lens shape, each of the pockets having a support which, when the corresponding to-be-inspected object is placed in the pocket, supports the to-be-inspected object through contact with the to-be-inspected object so as to extend along an outer periphery of the to-be-inspected object;

a plurality of first cameras disposed away from each other on a front surface side and a back surface side of the planar tray, the first cameras being capable of collectively and simultaneously imaging the plurality of to-be-inspected objects from the front surface side and the back surface side of the tray; and mirrors arranged on surfaces of each of the pockets so as to face respective side surfaces of the corresponding to-be-inspected object, wherein images of a front surface of each of the to-be-inspected objects, the side surfaces of the to-be-inspected object that are reflected by the respective mirrors, and a back surface of the to-be-inspected object, are collectively and simultaneously taken by the first cameras, to inspect the to-be-inspected object.

10. The appearance inspection method for goods, according to claim 9, wherein the appearance inspection device further includes a lighting device which is selected according to a shape or a size of each of the to-be-inspected objects and which is disposed outside of an angle of view of each of the cameras, and each of side surfaces of the to-be-inspected object is imaged under a predetermined lighting condition, to perform appearance inspection.

* * * * *